US 6,742,393 B2

(12) United States Patent
Ito

(10) Patent No.: US 6,742,393 B2
(45) Date of Patent: Jun. 1, 2004

(54) VIBRATION CONTROL APPARATUS, VIBRATION CONTROL METHOD, EXPOSURE APPARATUS, AND DEVICE MANUFACTURING METHOD

(75) Inventor: Hiroshi Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/367,943

(22) Filed: Feb. 19, 2003

(65) Prior Publication Data

US 2003/0159517 A1 Aug. 28, 2003

(30) Foreign Application Priority Data

Feb. 26, 2002  (JP) ......................................... 2002-050285

(51) Int. Cl.$^7$ .............................. G01M 7/02; F16F 7/10; F16M 1/00; F16M 13/00
(52) U.S. Cl. ........................ 73/662; 188/378; 267/136; 248/550
(58) Field of Search ......................... 73/662, 663, 664, 73/665; 188/378; 248/550, 562, 563, 638, 188.2, 559; 267/136

(56) References Cited

U.S. PATENT DOCUMENTS

| 5,250,880 A | * | 10/1993 | Chesney et al. ............ 318/135 |
| 5,504,407 A | * | 4/1996 | Wakui et al. ........... 318/568.17 |
| 5,568,032 A | * | 10/1996 | Wakui ........................ 318/632 |
| 5,900,707 A | * | 5/1999 | Wakui ........................ 318/625 |
| 5,909,272 A | | 6/1999 | Osanai et al. ................. 355/53 |
| 5,939,852 A | | 8/1999 | Akutsu et al. .............. 318/640 |
| 6,008,882 A | | 12/1999 | Ito et al. ....................... 355/53 |
| 6,028,376 A | | 2/2000 | Osanai et al. ................. 310/12 |
| 6,170,622 B1 | * | 1/2001 | Wakui et al. ............... 188/378 |
| 6,286,644 B1 | * | 9/2001 | Wakui ........................ 188/378 |
| 6,359,679 B1 | | 3/2002 | Ito et al. ....................... 355/75 |
| 6,448,723 B1 | * | 9/2002 | Wakui ........................ 318/135 |
| 6,523,695 B1 | * | 2/2003 | Ueta et al. ................... 267/136 |

FOREIGN PATENT DOCUMENTS

| JP | 5-250648 | 9/1993 |
| JP | 7-83276 | 3/1995 |

\* cited by examiner

*Primary Examiner*—Hezron Williams
*Assistant Examiner*—Jacques Saint-Surin
(74) *Attorney, Agent, or Firm*—Fitzpatrick, Cella, Harper & Scinto

(57) ABSTRACT

The object of this invention is to constitute a high-accuracy position control system even for a low-rigidity object to be controlled. To achieve this object, a vibration control apparatus includes a measurement device which measures the elastic vibration of an object to be controlled, a driving device which applies a force to the object, and a compensation device which determines a force to be generated by the driving device. The measurement device measures at least a position component out of the position, speed, and acceleration components of the elastic vibration. The compensation device controls the elastic vibration of the object on the basis of position information measured by the measurement device.

16 Claims, 15 Drawing Sheets

F I G. 2
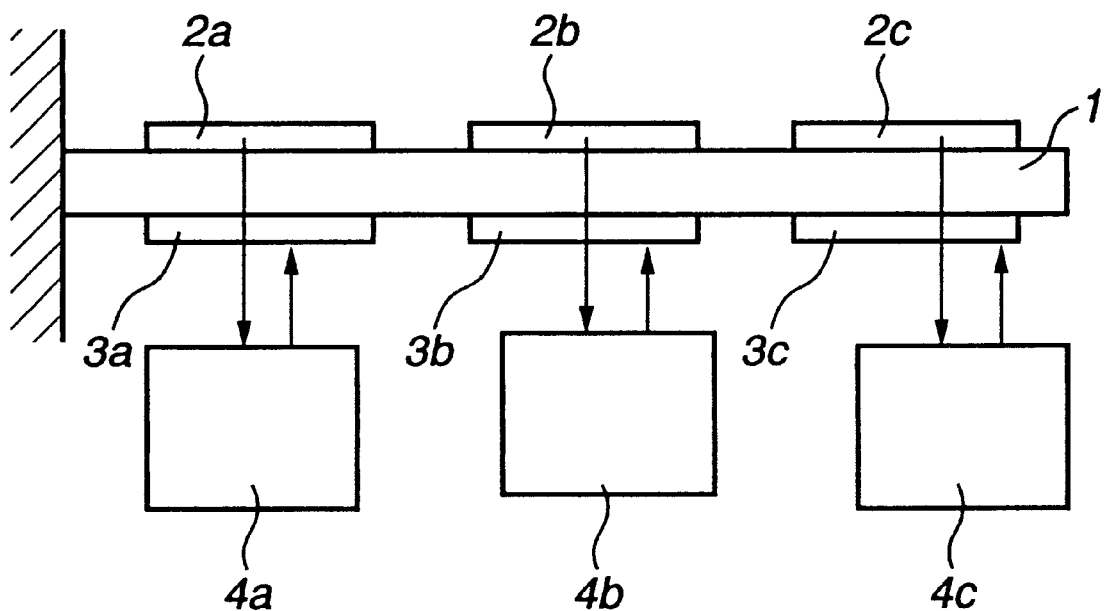

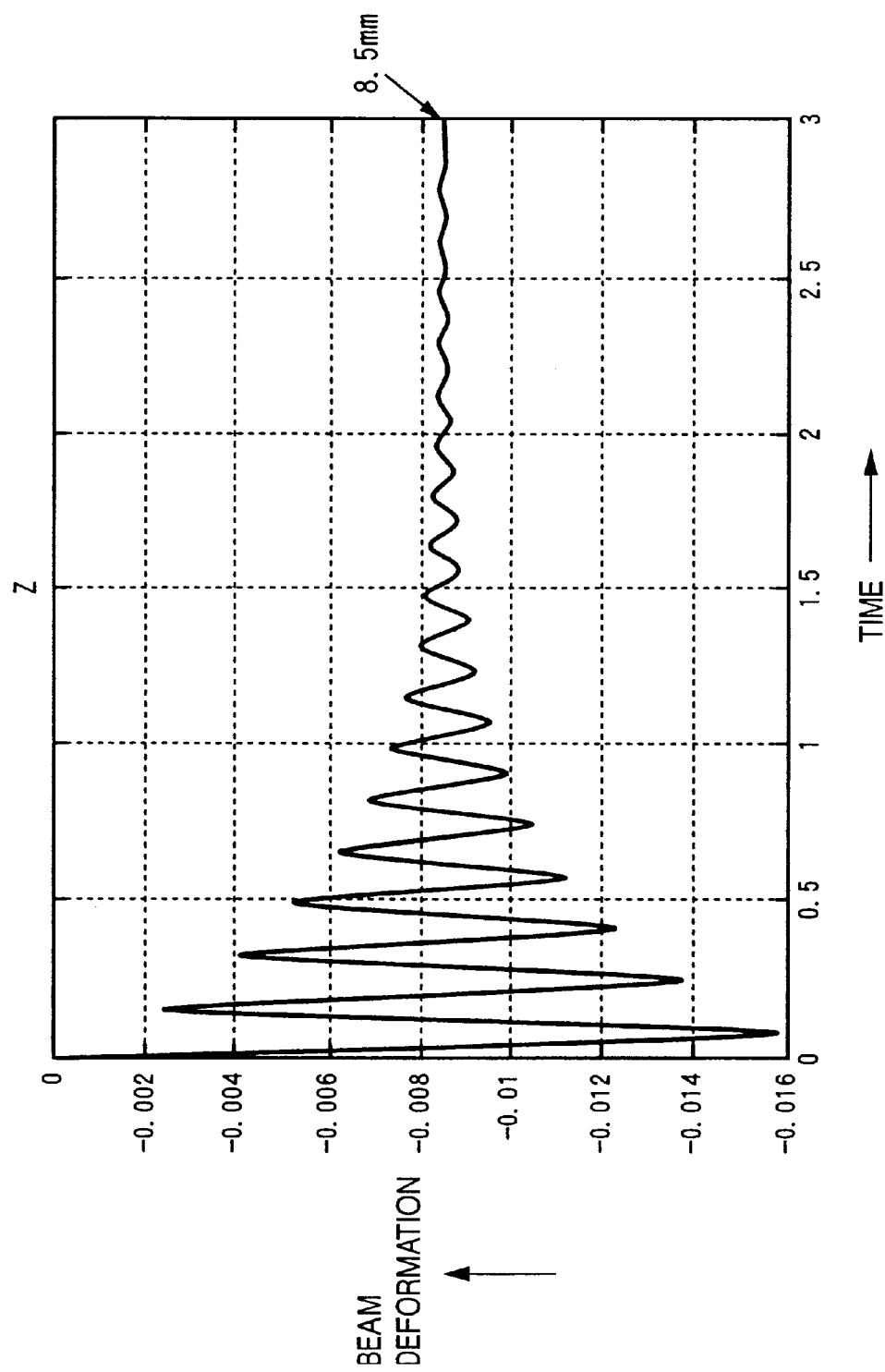

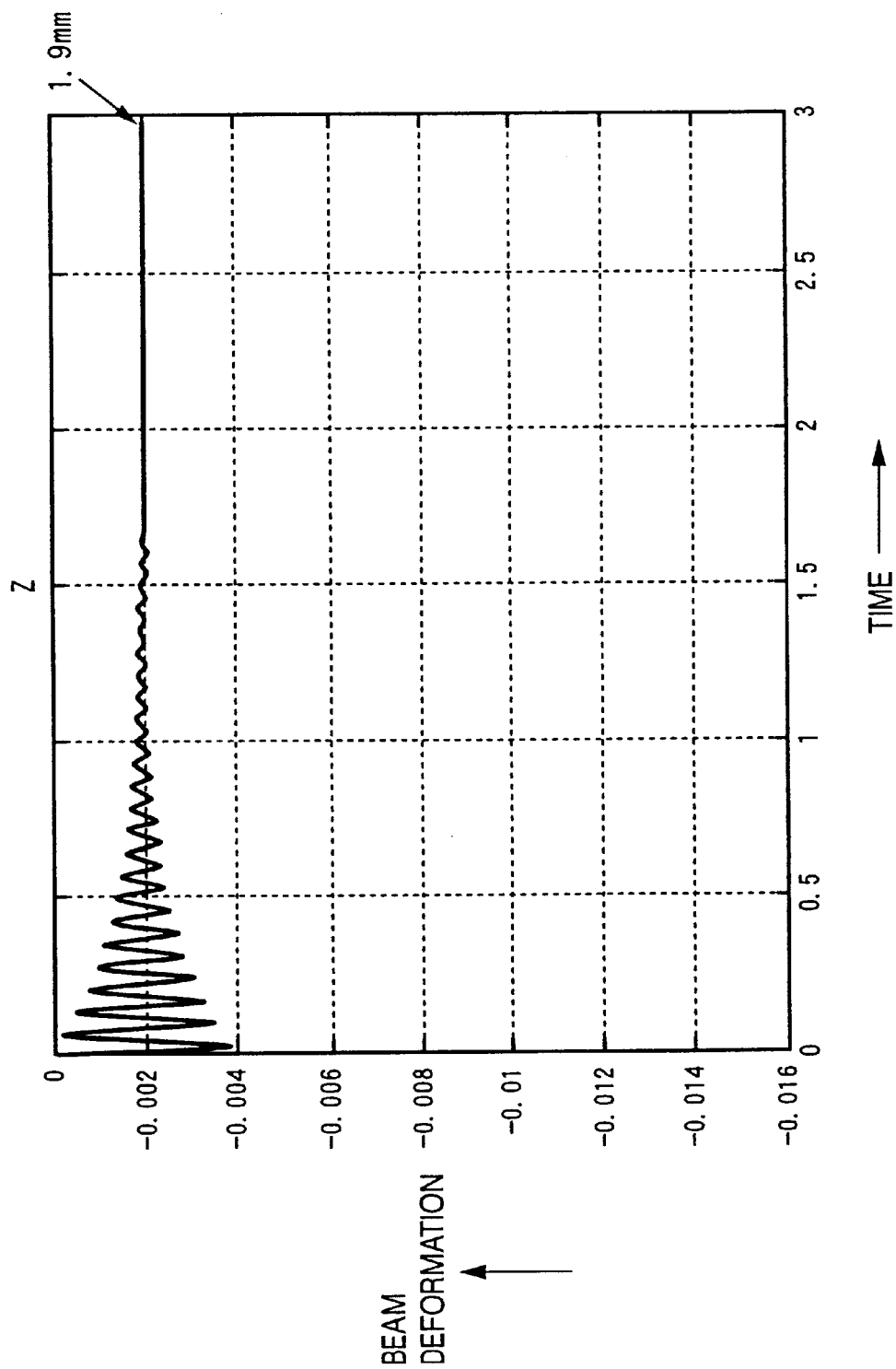

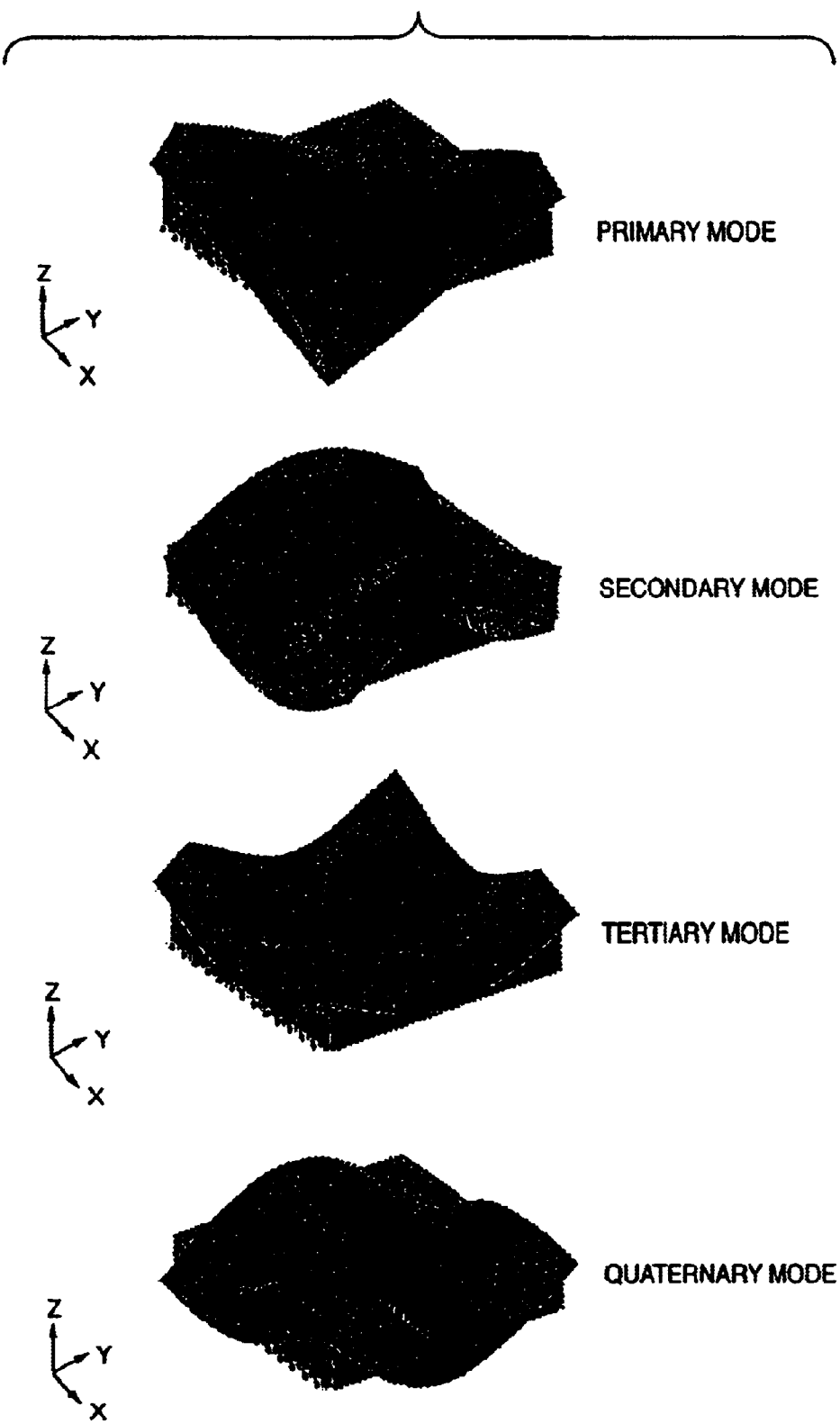

VIBRATION CONTROL APPARATUS, VIBRATION CONTROL METHOD, EXPOSURE APPARATUS, AND DEVICE MANUFACTURING METHOD

FIELD OF THE INVENTION

The present invention relates to a vibration control apparatus and method used when the vibration of a movable element influences the control accuracy in a field where high-speed, high-accuracy position/speed control is required for a semiconductor exposure apparatus, machine tool, OA device, and the like.

BACKGROUND OF THE INVENTION

A prior art will be described by exemplifying stage control of a semiconductor exposure apparatus.

As the exposure line width has decreased in a semiconductor exposure apparatus, the position control accuracy required for the wafer stage of the exposure apparatus has reached several nm order. For higher productivity, the stage moving acceleration and speed are increasing year by year. To realize high-speed, high-accuracy position control, the wafer stage position control system must have a high servo band. A high servo band exhibits a high response characteristic to a target value, realizing a system resistant to the influence of disturbance or the like. In manufacturing an apparatus, the wafer stage and main body structure are so designed as to realize a servo band as high as possible.

FIG. 10 is a view showing the schematic arrangement of the wafer stage of a conventional semiconductor exposure apparatus. In the following description, three translation axes (X, Y, and Z) of standard coordinates and three rotation axes ($\theta x$, $\theta y$, and $\theta z$) around the three translation axes will be called a position with six degrees of freedom. The arrangement and operation of a high-speed, high-accuracy position control system will be explained using this example.

Reference numeral 41 denotes a surface plate which is supported via a damper from a floor F; and 43, a Y stage which can be moved in the Y direction on the reference plane of the surface plate 41 by Y linear motors 46 for generating a thrust in the Y direction along a guide 42 fixed to the surface plate 41. The surface plate 41, fixed guide 42, and Y stage 43 are coupled in a noncontact manner by air via air pads 44a and 44b serving as hydrostatic bearings. The Y stage 43 has an X guide, which guides an X stage 45 mounted on the Y stage in the X direction. The Y stage 43 has an X linear motor stator which generates a force in the X direction. The X linear motor stator drives the X stage 45 in the X direction together with an X linear motor movable element mounted on the X stage. The surface plate 41, X guide, and X stage 45 are coupled in a noncontact manner by air via an air pad 44c serving as a hydrostatic bearing.

The X stage 45 supports a tilt stage 48. The tilt stage 48 moves in the Z direction and rotates along the three axes ($\theta x$, $\theta y$, and $\theta z$) by a thrust from a linear motor (not shown). The tilt stage 48 supports a stage plate 51 having a wafer chuck, which holds a wafer 53 to be exposed. Measurement mirrors 49a and 49b used to measure X and Y positions are arranged on the stage plate 51.

The stage device of the semiconductor exposure apparatus is aligned with six degrees of freedom in in-plane directions (X, Y, and $\theta z$) and vertical directions (Z, $\theta x$, and $\theta y$) with respect to the reference plane of the surface plate, and performs exposure of one chip. Positions in the in-plane directions (X, Y, and $\theta z$) are measured using a laser interferometer 50 integrated with a lens barrel (not shown). As for measurement in the tilt directions (Z, $\theta x$, and $\theta y$), a Z position and the angle of a rotational component are measured by an alignment measurement system (not shown) integrated with the lens barrel.

In FIG. 10, the lens barrel is assumed to be integrated with the surface plate, and the laser interferometer 50 is connected to the surface plate. Although no Z measurement device is illustrated, the tilt directions (Z, $\theta x$, and $\theta y$) can be measured by measuring three points on the stage plate or wafer from the lens barrel.

Alignment along the six axes is achieved by arranging a servo system for each axis. A compensation device calculates driving command values to the X and Y linear motors serving as X and Y stage actuators on the basis of position information of the laser interferometer, driving the X and Y stages. The compensation device calculates a driving command value to the tilt stage in accordance with the Z position, the angles in the rotational directions ($\theta x$ and $\theta y$), and the $\theta z$ measurement value, driving the tilt stage.

The position control system having this arrangement can move the wafer stage to a target position at a high speed and high accuracy.

The resolution of the exposure line width is high in the stage device of the semiconductor exposure apparatus, and the position control accuracy must be high. Also, the semiconductor exposure apparatus, which is a production equipment, must have high throughput in terms of productivity. To meet these demands, the stage servo system must have a high response characteristic and move at a high speed. To increase the stage position control accuracy, the designer realizes a high servo band by setting the gain of the position control system as high as possible. However, if the designer tries to set the gain higher, its upper limit is restricted by the oscillation of the servo system. The servo band is restricted by various factors, one of which is the elastic vibration of a mechanical system in the control loop.

FIG. 8 shows the analysis result of the elastic vibration mode of the wafer stage plate 51. The primary to quaternary elastic vibration modes are illustrated. Such a thin plate is low in Z rigidity and vibrates by elastic deformation such as bending or twist. The transfer characteristic from the Z actuator to a measurement point at this time is shown in FIG. 9, and the resonance point of elastic vibration has a high peak. If, for example, the loop gain of the Z position control system is increased in this system, the resonance point of elastic vibration is excited, decreasing the stage control accuracy. With a loop gain low to a given degree, merely a large vibration appears. With a higher gain, the servo system becomes unstable and oscillates.

In this fashion, the stage plate (top plate) and the like generate elastic vibrations, and the servo system becomes unstable. Even if the servo system does not become unstable, the control error increases, failing to satisfy control specifications. In general, the servo band is restricted to about ⅓ to ¼ the lowest resonance frequency of the elastic vibration.

In the conventional position control system, the servo band of the position control system is restricted by the resonance frequency of the elastic vibration of an object to be controlled. To realize a higher servo band, the resonance frequency of the elastic vibration must be increased, or the damping characteristic must be enhanced. For this purpose, the rigidity of an object to be controlled is increased, its mass is decreased, or the damping characteristic of the elastic vibration is enhanced. However, mechanical measures such as a decrease in stage mass, an increase in rigidity, and enhancement of the damping characteristic are limited, and it is difficult to increase the servo band.

SUMMARY OF THE INVENTION

The present invention has been made to overcome the conventional drawbacks, and has as its object to constitute a high-accuracy position control system even for a low-rigidity object to be controlled.

To solve the above-described problem and achieve the above object, according to the first aspect of the present invention, a vibration control apparatus is characterized by comprising a measurement device which measures an elastic vibration of an object to be controlled, a driving device which applies a force to the object, and a compensation device which determines a force to be generated by the driving device, wherein the measurement device measures at least a position component out of the position component, a speed component, and an acceleration component of the elastic vibration, and the compensation device controls the elastic vibration of the object on the basis of position information measured by the measurement device.

The vibration control apparatus according to the present invention is characterized in that the object to be controlled is supported by a spring in a noncontact manner.

The vibration control apparatus according to the present invention is characterized in that a higher vibration mode can be controlled by connecting, to the object to be controlled, pluralities of driving devices and measurement devices.

The vibration control apparatus according to the present invention is characterized in that an in-plane vibration of the elastic vibration is controlled by arranging at least one of the plurality of driving devices so as to prevent a force acting direction from being parallel.

The vibration control apparatus according to the present invention is characterized in that at least two of the plurality of driving devices are so arranged as to make force acting directions substantially perpendicular to each other.

The vibration control apparatus according to the present invention is characterized in that the object to be controlled includes a stage top plate of an exposure apparatus, the measurement device includes a piezoelectric element attached to the top plate, and the driving device includes a piezoelectric element attached to the top plate.

A vibration control apparatus according to the present invention is characterized by comprising a first measurement device which measures an elastic vibration of an object to be controlled, a first driving device which applies a force to the object, a first compensation device which determines a force to be generated by the driving device, a second measurement device which measures a position of the object from a reference position, a second driving device which externally applies a force to the object, and a second compensation device which determines a force to be generated by the second driving device, wherein the first measurement device measures at least a speed component out of a position component, the speed component, and an acceleration component of the elastic vibration, the first compensation device controls the elastic vibration of the object on the basis of speed information measured by the first measurement device, and the second compensation device controls a rigid-body vibration of the object on the basis of position information measured by the second measurement device.

According to the second aspect of the present invention, an exposure apparatus is characterized by using the above-described vibration control apparatus for a stage.

According to the third aspect of the present invention, a device manufacturing method is characterized by comprising the steps of applying a photosensitive material to a substrate, transferring a pattern to the photosensitive material on the substrate coated with the photosensitive material by the above-described exposure apparatus, and developing the substrate bearing the pattern.

According to the fourth aspect of the present invention, a vibration control method using a vibration control apparatus having a measurement device which measures an elastic vibration of an object to be controlled, a driving device which applies a force to the object, and a compensation device which determines a force to be generated by the driving device is characterized in that the measurement device measures at least a position component out of the position component, a speed component, and an acceleration component of the elastic vibration, and the compensation device controls the elastic vibration of the object on the basis of position information measured by the measurement device.

According to the fifth aspect of the present invention, a vibration control method using a vibration control apparatus having a first measurement device which measures an elastic vibration of an object to be controlled, a first driving device which applies a force to the object, a first compensation device which determines a force to be generated by the driving device, a second measurement device which measures a position of the object from a reference position, a second driving device which externally applies a force to the object, and a second compensation device which determines a force to be generated by the second driving device is characterized in that the first measurement device measures at least a speed component out of a position component, the speed component, and an acceleration component of the elastic vibration, the first compensation device controls the elastic vibration of the object on the basis of speed information measured by the first measurement device, and the second compensation device controls a rigid-body vibration of the object on the basis of position information measured by the second measurement device.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 2 is a view showing an arrangement for controlling the higher elastic mode of the beam;

FIG. 7B is a graph showing the effect of the position loop;

FIG. 7C is a graph showing the effect of the position loop;

FIG. 8 is a view showing vibrations in the elastic mode of the top plate;

DETAILED DESCRIPTION OF THE PREFERRED EMBODIMENTS

Preferred embodiments of the present invention will be described in detail below with reference to the accompanying drawings.

The outline of the present invention is as follows.

For example, the position component of the elastic vibration is measured, and a force obtained by multiplying the position component by a coefficient and inverting the phase is applied to a deformed portion to cancel the elastic deformation. The resonance frequency of the elastic vibration of the system can therefore be increased. Alternatively, the speed component of the elastic vibration is measured, and a force obtained by multiplying the speed component by a coefficient and inverting the phase is applied to a deformed portion, thereby enhancing the damping characteristic of the elastic vibration. Such an elastic vibration control system is arranged in the position control system, obtaining a higher position control loop gain than that of the conventional position control system.

Note that the position, speed, and acceleration components of elastic motion will be generally called elastic vibration. Elastic deformation is used particularly when attention is paid to the position component of the elastic vibration, but this definition is not so strict. Distortion is the ratio of a length upon deformation to the length of an undeformed portion of an object, and is also included in the elastic vibration.

(First Embodiment)

It has conventionally been practiced to measure the speed component of the elastic vibration, apply a force opposite in phase to the speed to a deformed portion, and thus damp the elastic vibration. In the first embodiment, the position component of the elastic vibration is measured, and a force opposite in phase to the position component is applied to a deformed portion. This allows arbitrarily controlling the degree of deformation. Further, the rigidity to the elastic deformation can be apparently increased, i.e., the resonance frequency of the elastic deformation can be changed.

Figure 1:
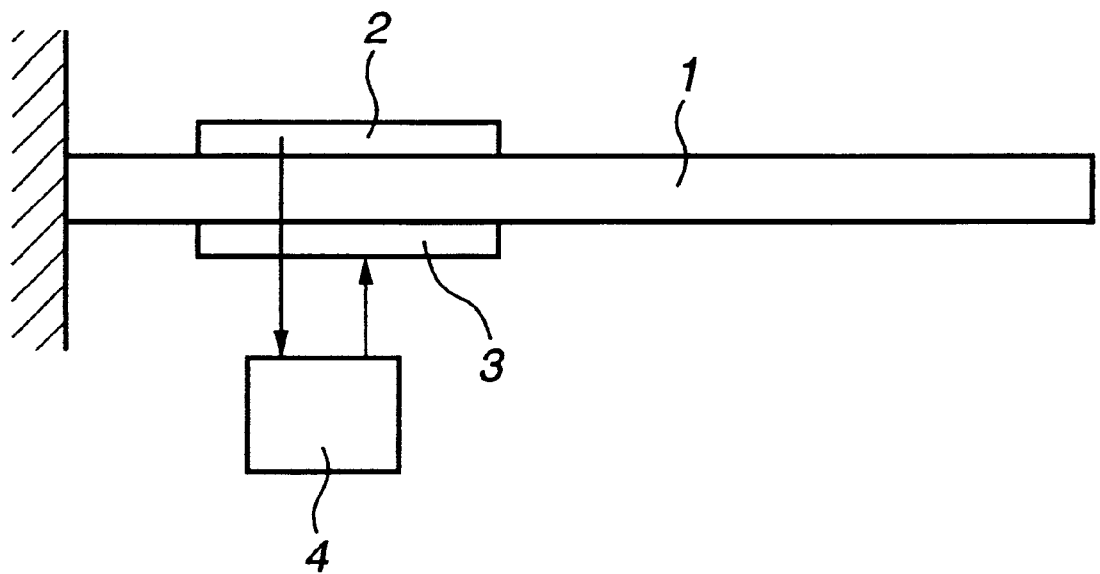
FIG. 1 is a view showing an arrangement for controlling the elastic deformation of a beam.

In FIG. 1, an object 1 to be controlled is a cantilever. A driving (force generation) device 3 which causes elastic deformation is connected near the proximal portion of the cantilever. A measurement device 2 which measures the elastic deformation is connected on a side opposite to the driving device 3. A position signal measured by the measurement device 2 is input to a compensation device 4, and a force to be generated is output to the driving device 3. Note that the driving device 3 and measurement device 2 are formed from piezoelectric elements or the like.

Figure 7A:
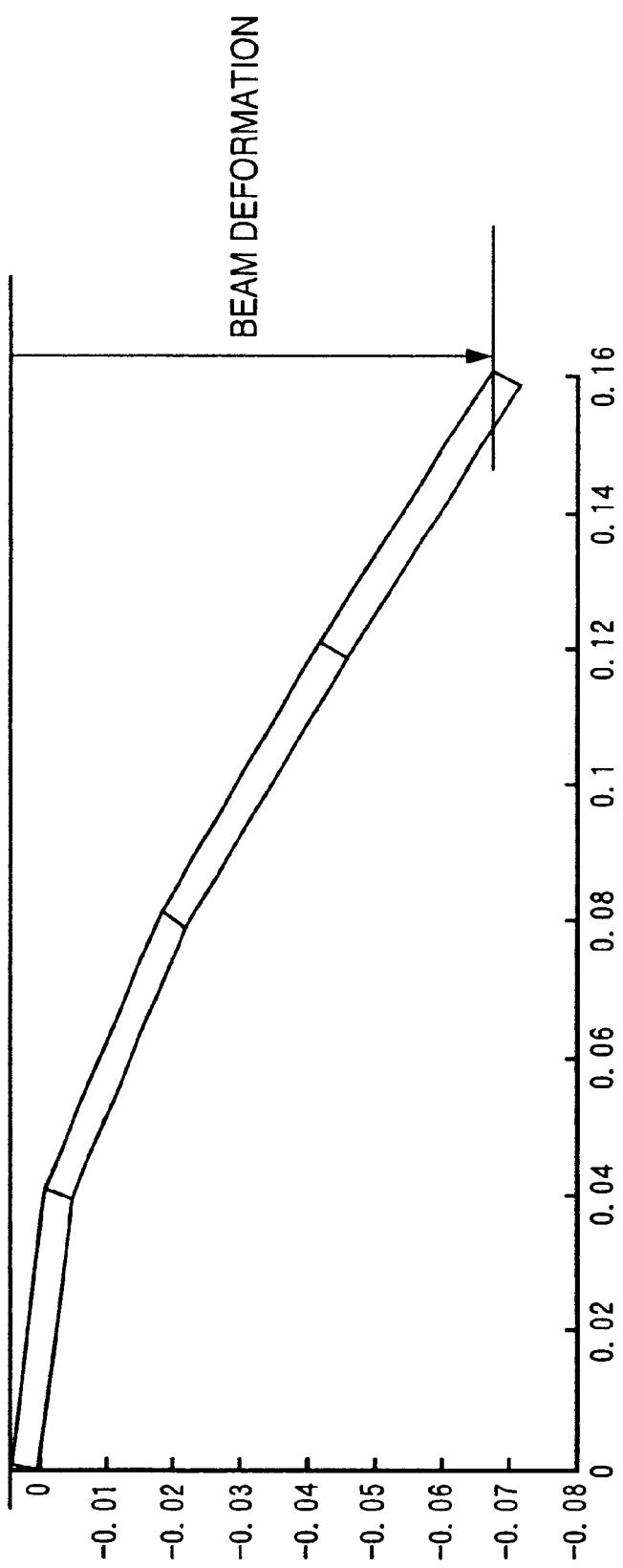
FIG. 7A is a graph showing the effect of a position loop.
Figure 9:
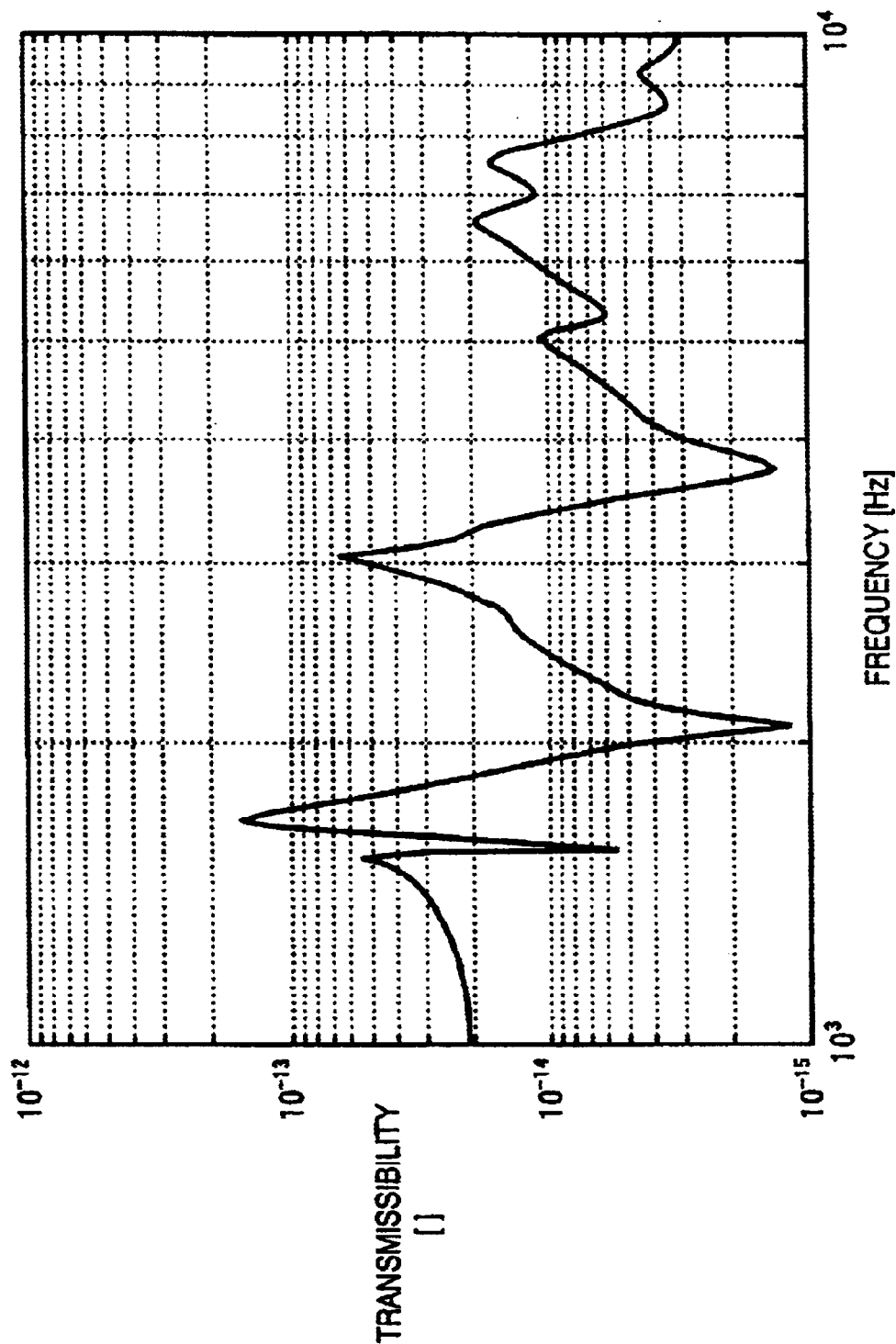
FIG. 9 is a graph showing a transfer characteristic from the force to displacement of the top plate.

FIG. 7A shows the deformation of the cantilever. FIGS. 7B and 7C show the displacement of the distal end of the cantilever as a function of the time response. If no position control is done, the distal end finally deforms by 8.5 mm from a horizontal position as an initial position due to the gravity, as shown in FIG. 7B. If the position control system operates, the cantilever deforms by 1.9 mm, as shown in FIG. 7C. The degree of deformation can be changed by a displacement command value supplied to the position control system. As is apparent from the response of the system, the maximum vibration value is also suppressed low and the vibration damps quickly in a system having undergone position control. The degree of bending cannot be controlled by a conventional method of controlling only the speed component of deformation.

This system adopts, e.g., a PID compensation device as the compensation device. The PID compensation device 4 in FIG. 3A receives the difference between a displacement command value and an elastic vibration (position component) measured by the measurement device 2. The PID compensation device 4 calculates an elastic vibration force command value, and instructs the driving device 3 of it. In this case, K is the proportional gain, Ti is the integral time constant, Td is the derivative time constant, and s is the Laplace operator.

Figure 3A:
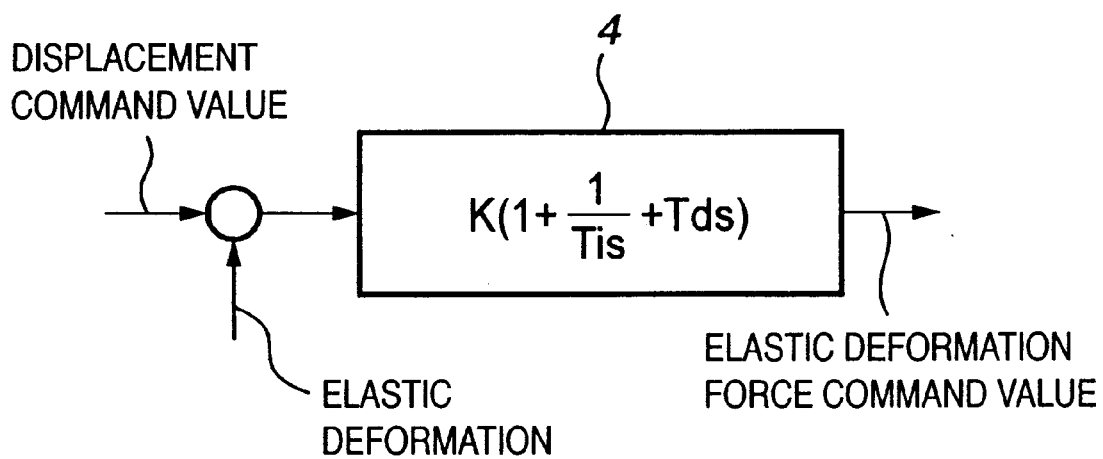
FIG. 3A is a diagram showing the arrangement of a PID compensation device.
Figure 3B:
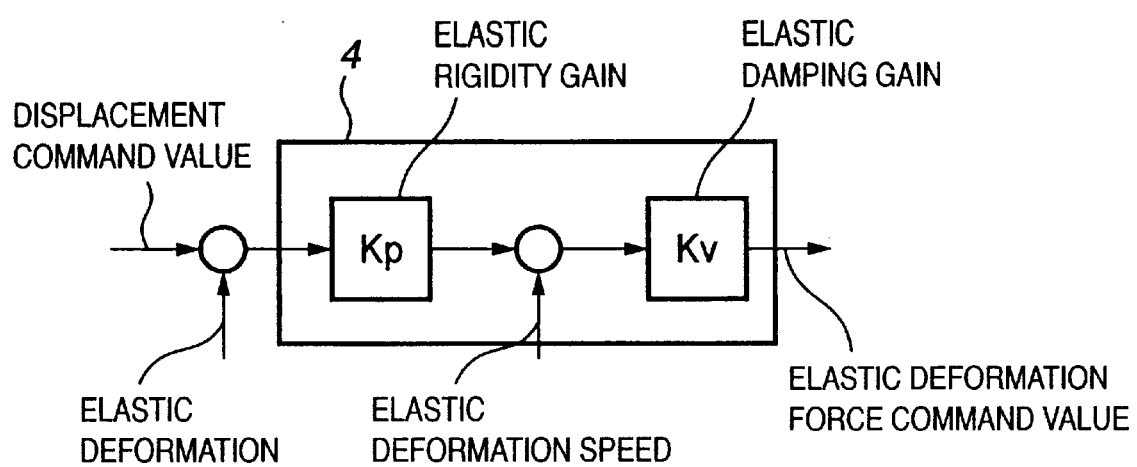
FIG. 3B is a diagram showing an arrangement using a speed miner loop.

As another control method of this system, the compensation device can be formed from, instead of the PID compensation device in FIG. 3A, a loop which controls the position component of the vibration, and an inner speed miner loop which feeds back the speed component of the vibration, as shown in FIG. 3B. The compensation device 4 in FIG. 3B multiplies, by an elastic rigidity gain Kp, the difference between a displacement command value and an elastic vibration (position component) measured by the measurement device 2. Further, the compensation device 4 multiplies, by an elastic damping gain Kv, the difference between the product and an elastic vibration speed component measured by the measurement device 2, thus calculating an elastic vibration force command value. The compensation device 4 instructs the driving device 3 of the elastic vibration force command value.

Note that Japanese Patent Laid-Open No. 5-250648 discloses a technique for controlling a magnetic head. In this reference, the magnetic head position is controlled by elastically deforming a posture adjustment base. According to this method, the displacement as a result of elastic deformation is measured, but the elastic deformation itself is not measured. In other words, a measurement value does not always exhibit only the elastic deformation but may contain the deformation or displacement of another member. To the contrary, the first embodiment measures the elastic deformation itself, and can damp the elastic vibration by using the speed component.

(Second Embodiment)

The second embodiment is directed to a system which controls the elastic vibration in the position control system of the wafer stage of a conventional semiconductor exposure apparatus.

Figure 10:
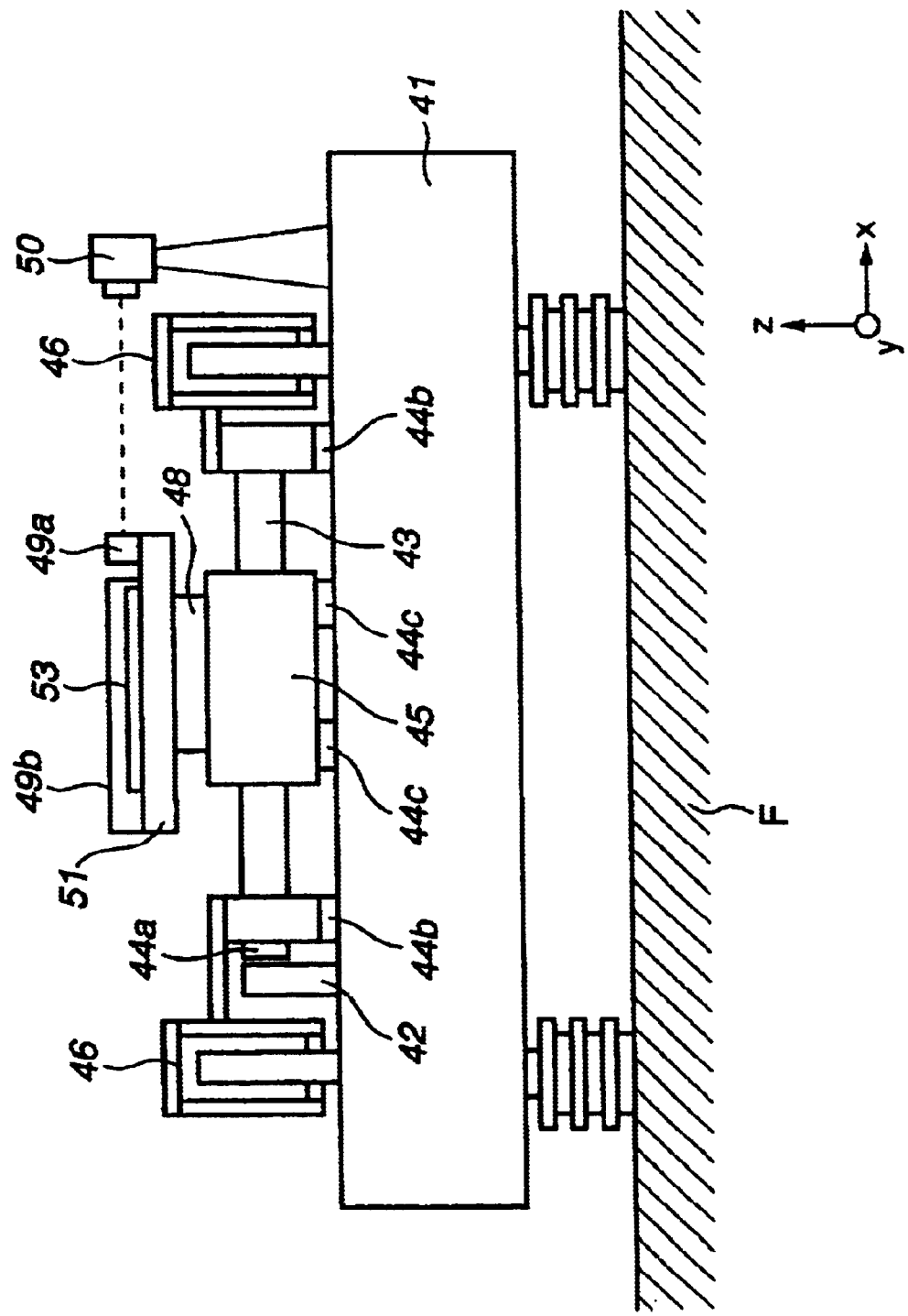
FIG. 10 is a view showing the arrangement of a conventional stage control system.

Although details of the tilt state are not illustrated in the prior art of FIG. 10, the tilt stage is assumed to be a six-axis fine moving stage. The X and Y stages in FIG. 10 operate as coarse moving stages. The tilt stage operates as the six-axis fine moving stage by adding linear motors for X and Y fine movements.

Figure 4:
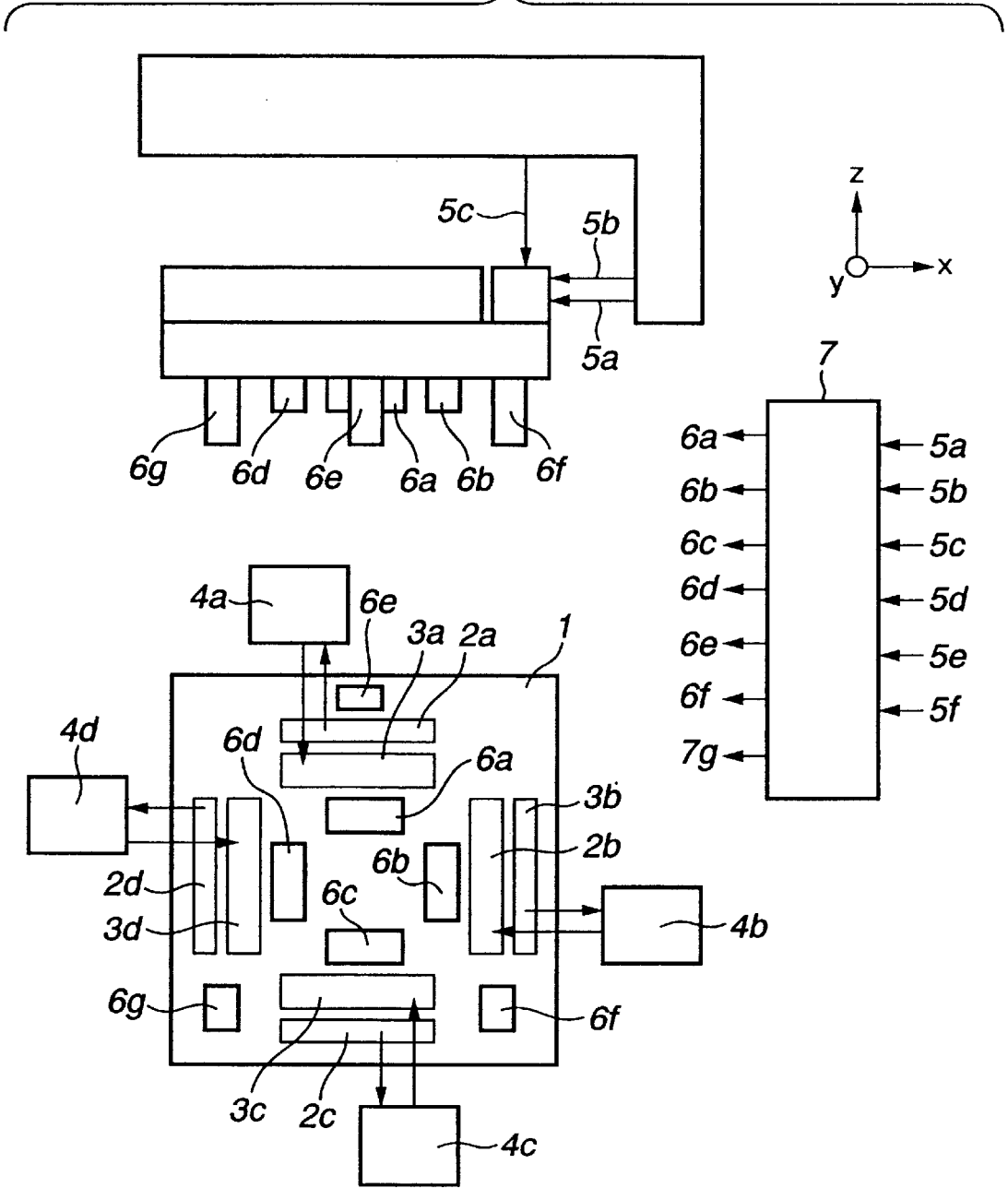
FIG. 4 is a view showing an arrangement for controlling an exposure apparatus plate.

The lower surface of the tilt stage is shown at the lower part of FIG. 4.

Reference numerals 6a to 6g denote linear motors which drive the tilt stage. The linear motors 6a to 6d generate a horizontal force, whereas the linear motors 6e to 6g generate a vertical force. The rigid-body vibration position of the tilt state is measured using measurement signals 5a to 5e by a laser interferometer. A compensation device 7 constitutes a servo system which determines command values to the linear motors on the basis of the position signals and controls the six-axis rigid-body vibration of the tilt stage. Note that a structure including a stage plate (top plate), laser interferometer mirror, and fine moving linear motor is called the tilt stage.

An elastic vibration control element on the lower surface of the stage plate will be explained.

Driving devices 3a to 3d which generate a force so as to bend a plate are connected to the lower surface of the stage plate serving as an object 1 to be controlled. Measurement devices 2a to 2d which measure bending distortion are connected adjacent to the driving devices. Compensation devices 4a to 4d receive speeds measured by the measurement devices 2a to 2d, and determine the generation forces of the driving devices 3a to 3d on the basis of the speed values. By feeding back the speed component, the elastic vibration damping characteristic of the top plate can be enhanced. This loop effect enables setting a high position loop gain of the loop which controls external rigid-body vibrations. As a result, the stage control accuracy can be increased.

(Third Embodiment)

In the system of the second embodiment, the position component of the elastic vibration of this system is fed back. In FIG. 4, elastic vibration measurement devices 2a to 2d output elastic vibration position information. Similar to the first embodiment, compensation devices 4a to 4d are formed from PID compensation devices, or position loops and speed miner loops. With this arrangement, the resonance frequency of the elastic vibration of the top plate can be set high. This leads to a high servo band of an external rigid-body vibration mode. The position loop gain of the rigid-body vibration mode can also be increased by the above-described speed feedback. However, the phase delay occurs in the speed feedback, and the gain is limited. In the position feedback, no phase delay occurs, and the position loop gain of the rigid-body vibration mode can be increased by an increase in the position loop gain of the elastic vibration mode.

In the second and third embodiments, the elastic vibration compensation devices 4a to 4d are independently arranged for the respective measurement devices. If each input or output suffers interference, the output can be determined in consideration of the interference. For example, when the force of a force generation device 3a appears in the elastic vibration measurement devices 2a and 2b, the measurement values of the measurement devices 2a and 2b are properly weighted to determine the command value of the driving device 3a.

(Fourth Embodiment)

Although not shown in FIG. 4, support members for supporting the weight of the tilt stage are connected on the axes of linear motors 6e to 6g. The top plate (stage plate) to be controlled is supported at three points and constrained in the X, Y, and Z directions. In this case, if the linear motor which controls the rigid-body vibration generates a force in the X direction, the top plate is excessively constrained and elastically deformed. However, when the top plate is supported in a noncontact manner by an air bearing or the like, the top plate is not horizontally constrained. The top plate is not excessively constrained by the horizontal force, and no elastic deformation occurs. This is an important advantage in a system such as a semiconductor exposure apparatus in which nm-order deformation poses a problem.

(Fifth Embodiment)

In the present invention, the elastic vibration (deformation) measurement device measures only elastic vibrations, and the driving device for generating elastic vibrations generates only elastic vibrations (deformation) In principle, it is also possible to measure vibrations as a combination of elastic vibrations and rigid-body vibrations and separate the rigid-body vibrations from the elastic vibrations in accordance with the measurement value. Moreover, a driving device which generates elastic vibrations and a driving device which generates rigid-body vibrations can be implemented by a single driving device.

As the prior art, there is known a control apparatus for a vertical air spring type vibration damping table as disclosed in Japanese Patent Laid-Open No. 7-83276. The purpose of this reference is to simultaneously control the rigid-body vibrations and elastic vibrations of the vibration damping table. According to this method, vibrations as a combination of rigid-body vibrations and elastic vibrations are measured, and the control input is also calculated in consideration of both the rigid-body vibrations and elastic vibrations. For this reason, a vibration mode extraction circuit and vibration mode distribution circuit for mode separation are required. The displacement and acceleration by rigid-body vibrations, and the displacement and acceleration by elastic vibrations are actually different in order. To measure these vibrations by one measurement device, the measurement range of the measurement device must be very wide. An actuator which causes elastic deformation is preferably formed from, e.g., a piezoelectric element capable of generating a large output with a small amplitude. In general, an actuator which controls rigid-body vibrations must have a large amplitude, and is preferably formed from, e.g., a linear motor. The necessary performance changes depending on the vibrations, and it is often difficult to use the same actuator for the two types of vibrations. However, the control system of the present invention does not require these circuits because measurement devices and driving (force generation) devices are separately arranged for rigid-body vibrations and elastic vibrations. Measurement devices and driving devices complying with characteristics necessary for control can be selected and easily implemented.

When no measurement device can be mounted on an object to be controlled owing to the system configuration, only the measurement device measures vibrations as a combination of rigid-body vibrations and elastic vibrations. The rigid-body vibrations and elastic vibrations are measured from the measurement value by using a vibration mode extraction circuit, and the arrangement of the first embodiment or the like can be employed. When no actuator can be mounted on an object to be controlled, the vibration mode distribution circuit which calculates a force necessary for rigid-body vibrations and elastic vibrations can be added to the first embodiment or the like.

Figure 6:
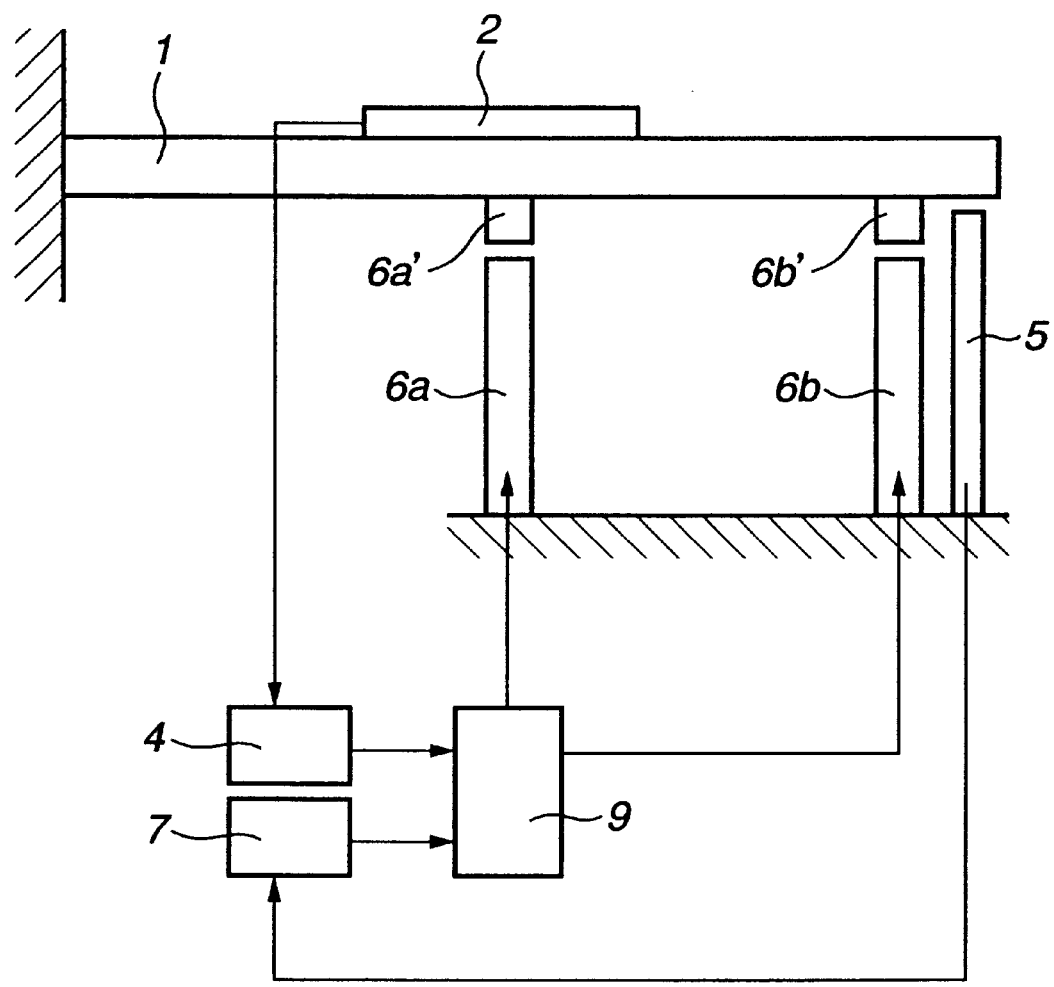
FIG. 6 is a view showing an arrangement for controlling the elastic vibration and rigid-body vibration of the beam by an external force.

FIG. 6 shows an arrangement when elastic vibrations and rigid-body vibrations are controlled using two actuators which control rigid-body vibrations.

The operation of this system will be explained. A beam 1 to be controlled generates elastic vibrations and rigid-body vibrations. A measurement device 2 as an elastic vibration measurement device inputs a measurement position to an elastic vibration compensation device 4. The compensation device 4 obtains a force necessary to cancel elastic vibrations, and outputs the value to a vibration mode distribution circuit 9. A rigid-body vibration measurement device 5 measures the displacement of the beam from a reference position, and inputs the measurement value to a rigid-body vibration compensation device 7. The compensation device 7 obtains a force necessary to cancel rigid-body vibrations, and outputs the value to the vibration mode distribution circuit 9. The vibration mode distribution circuit 9 instructs rigid-body vibration driving devices 6a and 6b of the forces necessary to cancel elastic vibrations and rigid-body vibrations. The rigid-body vibration driving devices 6a and 6b assume linear motors. The devices 6a and 6b are linear motor stators (coil side), and devices 6a' and 6b' are movable elements (permanent magnet side).

(Sixth Embodiment)

Figure 5:
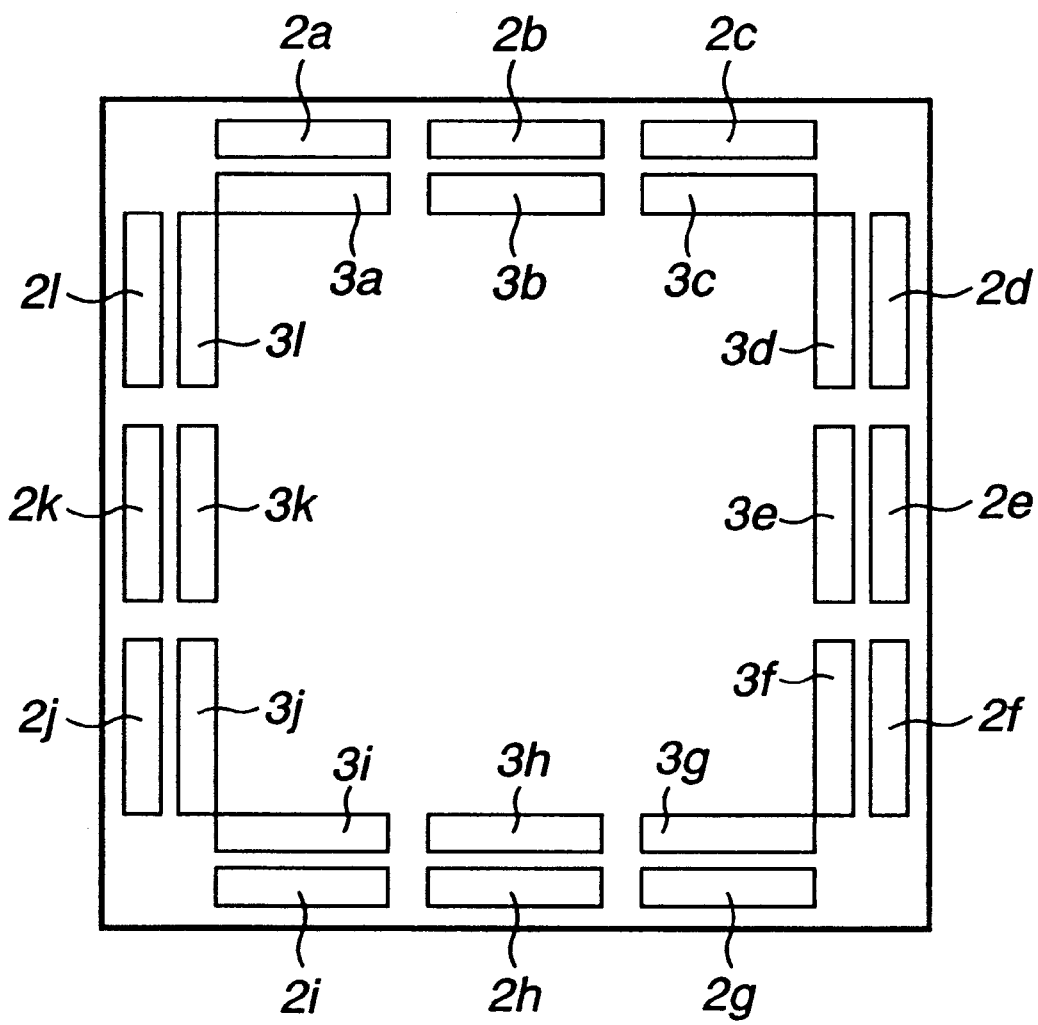
FIG. 5 is a view showing an arrangement for controlling the higher elastic mode of a top plate.

In the first embodiment, only the primary component of the bending mode of the beam is controlled. Vibrations in the secondary and tertiary bending modes of the beam can also be controlled by additionally arranging measurement devices and driving devices and connecting them as shown in, e.g., FIG. 2. Also for a flat plate in the second embodiment, only the primary bending component is controlled. Elastic vibrations in a higher mode can also be suppressed by connecting measurement devices and driving devices and connecting compensation devices to them, as shown in FIG. 5.

(Seventh Embodiment)

In-plane vibrations can be controlled by connecting measurement devices and force generation devices not only for a one-dimensional beam in the first embodiment but also for elastic vibrations within a plane in the second embodiment such that the force generation directions of the force generation devices do not become parallel to each other, similar to the first embodiment. Especially for an almost square shape, force generation directions perpendicular to each other are effective.

(Device Manufacturing Method)

A semiconductor device manufacturing process using an exposure apparatus in which the vibration control apparatus according to each of the first to seventh embodiments is applied to the stage will be explained.

Figure 11:
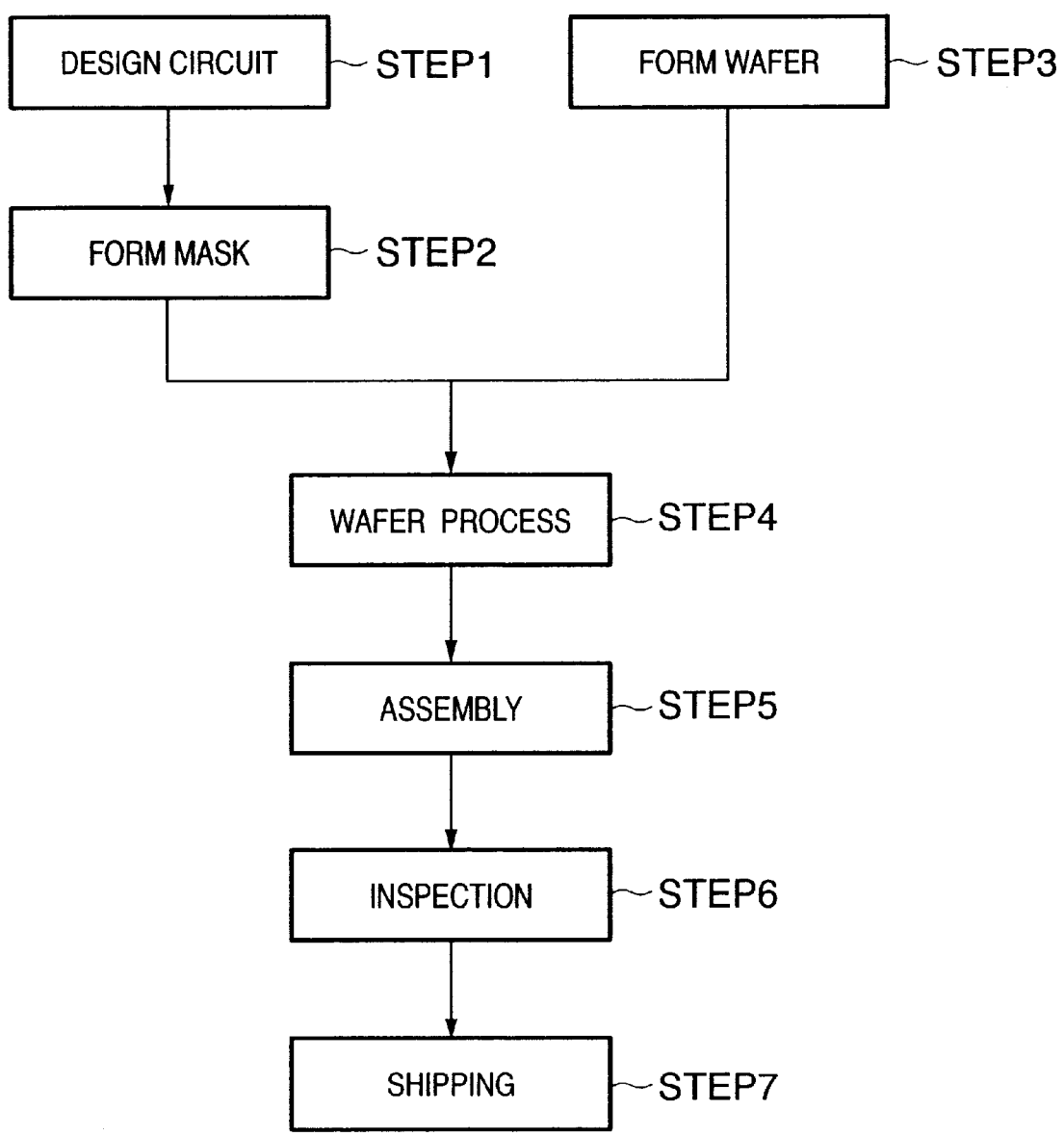
FIG. 11 is a flow chart showing the whole manufacturing process of a semiconductor device.

FIG. 11 shows the flow of the whole manufacturing process of a semiconductor device. In step 1 (circuit design), a semiconductor device circuit is designed. In step 2 (mask formation), a mask is formed on the basis of the designed circuit pattern. In step 3 (wafer formation), a wafer is formed using a material such as silicon. In step 4 (wafer process) called a pre-process, an actual circuit is formed on the wafer by lithography using the mask and wafer. Step 5 (assembly) called a post-process is the step of forming a semiconductor chip by using the wafer formed in step 4, and includes an assembly process (dicing and bonding) and packaging process (chip encapsulation). In step 6 (inspection), the semiconductor device manufactured in step 5 undergoes inspections such as an operation confirmation test and durability test. After these steps, the semiconductor device is completed and shipped (step 7).

Figure 12:
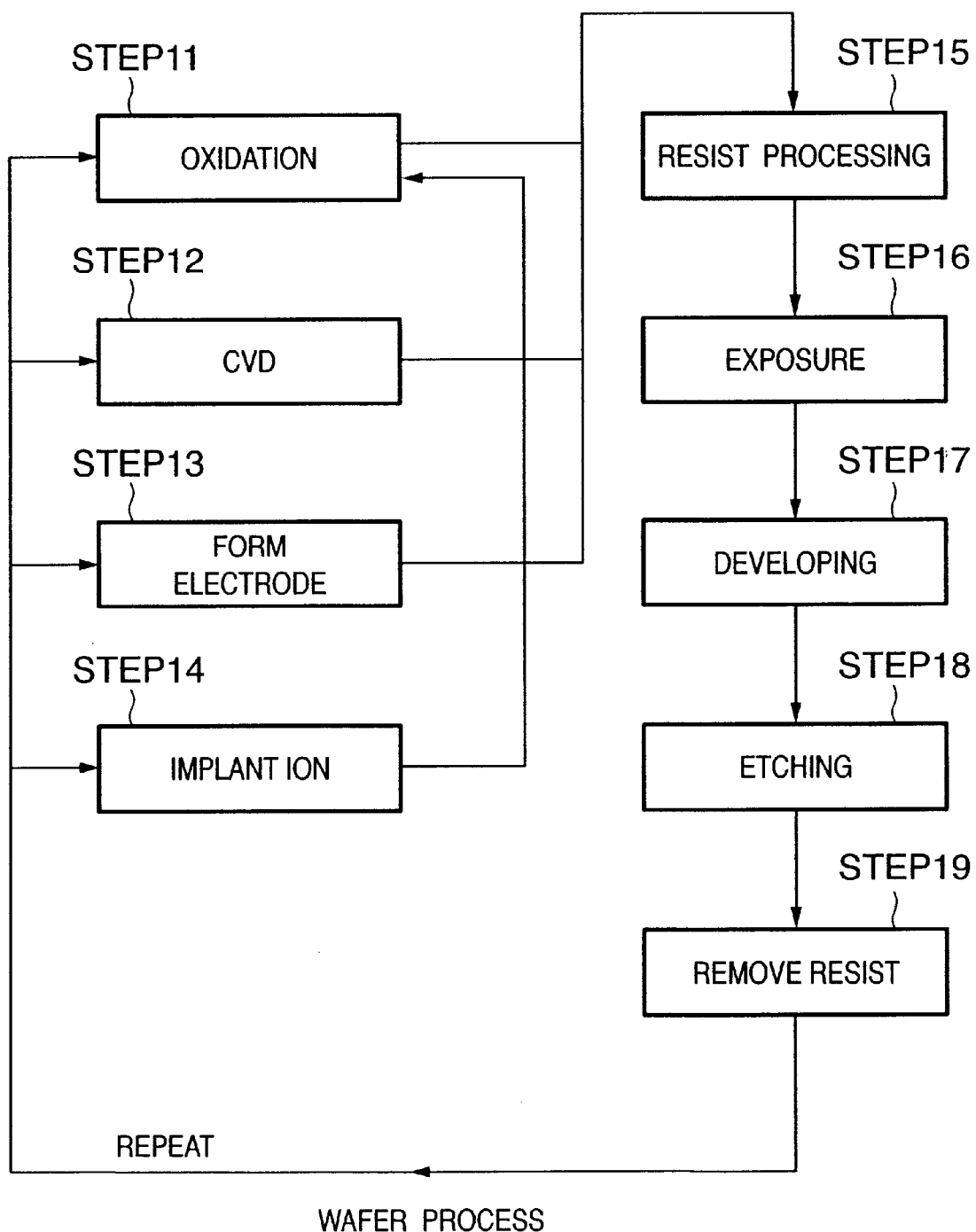
FIG. 12 is a flow chart showing the wafer process in FIG. 11 in detail.

FIG. 12 shows the detailed flow of the wafer process. In step 11 (oxidation), the wafer surface is oxidized. In step 12 (CVD), an insulating film is formed on the wafer surface. In step 13 (electrode formation), an electrode is formed on the wafer by vapor deposition. In step 14 (ion implantation), ions are implanted in the wafer. In step 15 (resist processing), a photosensitive agent is applied to the wafer. In step 16 (exposure), the above-mentioned exposure apparatus transfers a circuit pattern onto the wafer. In step 17 (developing), the exposed wafer is developed. In step 18 (etching), the resist is etched except the developed resist image. In step 19 (resist removal), an unnecessary resist after etching is removed. These steps are repeated to form multiple circuit patterns on the wafer.

As has been described above, the above embodiments control elastic vibrations, and can constitute a higher-accuracy position control system than a conventional one even for a lower-rigidity object to be controlled than a conventional one. As a result, a high-speed, high-accuracy apparatus can be implemented.

The present invention is not limited to the above embodiments and various changes and modifications can be made within the spirit and scope of the present invention. Therefore, to apprise the public of the scope of the present invention the following claims are made.

What is claimed is:

1. A vibration control apparatus comprising:

a measurement device which measures an elastic vibration of an object to be controlled;

a driving device which applies a force to the object; and a compensation device which determines a force to be generated by said driving device, wherein said measurement device measures at least a position component out of the position component, a speed component, and an acceleration component of the elastic vibration, and said compensation device controls the elastic vibration of the object on the basis of position information measured by said measurement device.

2. The apparatus according to claim 1, wherein the object to be controlled is supported by a spring in a noncontact manner.

3. The apparatus according to claim 1, wherein a higher vibration mode can be controlled by connecting, to the object to be controlled, pluralities of driving devices and measurement devices.

4. The apparatus according to claim 3, wherein an in-plane vibration of the elastic vibration is controlled by arranging at least one of said plurality of driving devices so as to prevent a force acting direction from being parallel.

5. The apparatus according to claim 4, wherein at least two of said plurality of driving devices are so arranged as to make force acting directions substantially perpendicular to each other.

6. The apparatus according to claim 1, wherein the object to be controlled includes a stage top plate of an exposure apparatus, said measurement device includes a piezoelectric element attached to the top plate, and said driving device includes a piezoelectric element attached to the top plate.

7. A vibration control apparatus comprising:

a first measurement device which measures an elastic vibration of an object to be controlled;

a first driving device which applies a force to the object;

a first compensation device which determines a force to be generated by said driving device;

a second measurement device which measures a position of the object from a reference position;

a second driving device which externally applies a force to the object; and a second compensation device which determines a force to be generated by said second driving device, wherein said first measurement device measures at least a speed component out of a position component, the speed component, and an acceleration component of the elastic vibration, said first compensation device controls the elastic vibration of the object on the basis of speed information measured by said first measurement device, and said second compensation device controls a rigid-body vibration of the object on the basis of position information measured by said second measurement device.

8. The apparatus according to claim 7, wherein the object to be controlled is supported by a spring in a noncontact manner.

9. The apparatus according to claim 7, wherein a higher vibration mode can be controlled by connecting, to the object to be controlled, pluralities of first driving devices and first measurement devices.

10. The apparatus according to claim 9, wherein an in-plane vibration of the elastic vibration is controlled by arranging at least one of said plurality of first driving devices so as to prevent a force acting direction from being parallel.

11. The apparatus according to claim 10, wherein at least two of said plurality of first driving devices are so arranged as to make force acting directions substantially perpendicular to each other.

12. The apparatus according to claim 7, wherein the object to be controlled includes a stage top plate of an exposure apparatus, said measurement device includes a piezoelectric element attached to the top plate, said driving device includes a piezoelectric element attached to the top plate, the reference position includes a position of a lens barrel, said second measurement device includes a mirror connected to the top plate and a laser interferometer connected to the lens barrel, and said second driving device includes a linear motor.

13. An exposure apparatus using a vibration control apparatus defined in claim 1 for a stage.

14. A device manufacturing method comprising the steps of:
   applying a photosensitive material to a substrate;
   transferring a pattern to the photosensitive material on the substrate coated with the photosensitive material by an exposure apparatus defined in claim 13; and
   developing the substrate bearing the pattern.

15. A vibration control method using a vibration control apparatus having a measurement device which measures an elastic vibration of an object to be controlled, a driving device which applies a force to the object, and a compensation device which determines a force to be generated by the driving device, wherein
   the measurement device measures at least a position component out of the position component, a speed component, and an acceleration component of the elastic vibration, and the compensation device controls the elastic vibration of the object on the basis of position information measured by the measurement device.

16. A vibration control method using a vibration control apparatus having a first measurement device which measures an elastic vibration of an object to be controlled, a first driving device which applies a force to the object, a first compensation device which determines a force to be generated by the driving device, a second measurement device which measures a position of the object from a reference position, a second driving device which externally applies a force to the object, and a second compensation device which determines a force to be generated by the second driving device, wherein
   the first measurement device measures at least a speed component out of a position component, the speed component, and an acceleration component of the elastic vibration, the first compensation device controls the elastic vibration of the object on the basis of speed information measured by the first measurement device, and the second compensation device controls a rigid-body vibration of the object on the basis of position information measured by the second measurement device.

* * * * *